US012710583B2

(12) United States Patent
Hasegawa et al.

(10) Patent No.: US 12,710,583 B2
(45) Date of Patent: Aug. 18, 2026

(54) MULTICORE OPTICAL FIBER

(71) Applicant: SUMITOMO ELECTRIC INDUSTRIES, LTD., Osaka (JP)

(72) Inventors: Takemi Hasegawa, Osaka (JP); Takahiro Suganuma, Osaka (JP); Hirotaka Sakuma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 256 days.

(21) Appl. No.: 18/101,135

(22) Filed: Jan. 25, 2023

(65) Prior Publication Data

US 2023/0266521 A1 Aug. 24, 2023

(30) Foreign Application Priority Data

Feb. 21, 2022 (JP) ................................. 2022-024891

(51) Int. Cl.
*G02B 6/02* (2006.01)
*G02B 6/44* (2006.01)

(52) U.S. Cl.
CPC ..... *G02B 6/02042* (2013.01); *G02B 6/02395* (2013.01); *G02B 6/4482* (2013.01)

(58) Field of Classification Search
CPC ............ G02B 6/02042; G02B 6/02395; G02B 6/4482
See application file for complete search history.

(56) References Cited

U.S. PATENT DOCUMENTS 5,566,196 A * 10/1996 Scifres ................ H01S 3/06708 372/6
8,041,173 B2 * 10/2011 Imamura ............ G02B 6/02338 385/125

(Continued)

FOREIGN PATENT DOCUMENTS

JP 2011-170099 A 9/2011
JP 2014-048645 A 3/2014

(Continued)

OTHER PUBLICATIONS

Arrizabalaga et al., High-performance vector bending and orientation distinguishing curvature sensor based on asymmetric coupled multi-core fibre. Sci Rep 10, 14058 (2020). (Year: 2020).*

(Continued)

*Primary Examiner* — Peter Radkowski
(74) *Attorney, Agent, or Firm* — Faegre Drinker Biddle & Reath LLP

(57) ABSTRACT

The MCF of the present disclosure suppresses occurrence of structural abnormality such as air bubbles in the vicinity of a boundary between a marker and a cladding. The MCF includes a glass optical fiber including a plurality of cores, a marker, and a cladding, and a resin coating. On a cross section of the MCF, centers of the plurality of cores and a center of the marker constitute a plane figure having a rotational symmetry of order 1 with respect to a center of the cross section. Moreover, on the cross section, the marker is disposed so as to be located on a circumference of a circle having a center coinciding with the center of the cross section and having the circumference passing through the respective centers of the plurality of cores.

3 Claims, 3 Drawing Sheets

(56) References Cited

U.S. PATENT DOCUMENTS 8,433,166 B2 * 4/2013 Nagashima ........ G02B 6/02042 385/100
8,655,132 B2 * 2/2014 Nagashima ........ G02B 6/02042 385/100
8,693,088 B2 * 4/2014 Fini ...................... G02B 6/2856 359/334
8,705,925 B2 * 4/2014 Terada .................. G02B 6/138 385/129
8,725,001 B2 * 5/2014 Fini ...................... H04J 14/052 398/145
8,784,303 B2 * 7/2014 Laby .................... A61B 1/0055 600/117
9,007,681 B2 * 4/2015 Zhu ..................... H01S 3/06737 359/341.1
9,025,239 B2 * 5/2015 Zhu ..................... H01S 3/06754 359/341.1
9,052,432 B2 * 6/2015 Yao .................... G02B 6/02042
9,086,519 B2 * 7/2015 Arakawa ............ G02B 6/02042
9,140,850 B2 * 9/2015 Mimura .............. H01S 3/06754
9,244,217 B2 * 1/2016 Sasaoka ............... G02B 6/4246
9,625,656 B2 * 4/2017 Sasaki .................... G02B 6/245
11,137,538 B2 * 10/2021 Borrelli .............. G02B 6/02042
11,137,539 B2 * 10/2021 Borrelli .................. H04B 10/70
12,105,321 B2 * 10/2024 Pandey .............. G02B 6/02338
2010/0099951 A1 * 4/2010 Laby ...................... A61B 1/009 600/144
2010/0296784 A1 * 11/2010 Imamura ............ G02B 6/02042 385/126
2011/0110623 A1 * 5/2011 Terada .................. C08G 61/08 385/132
2011/0279888 A1 * 11/2011 Fini ..................... H01S 3/06737 359/334
2012/0087626 A1 * 4/2012 Nagashima ........ G02B 6/02042 385/124
2013/0016949 A1 * 1/2013 Yao .................... G02B 6/02042 385/126
2013/0129292 A1 * 5/2013 Sasaoka ............... G02B 6/4246 385/126
2013/0195411 A1 * 8/2013 Nagashima ........ G02B 6/02042 385/126
2014/0003779 A1 * 1/2014 Arakawa ................. G02B 6/46 385/127
2014/0168756 A1 * 6/2014 Zhu ..................... H01S 3/06754 385/127
2014/0307304 A1 * 10/2014 Zhu .................... G02B 6/02347 359/341.3
2016/0252683 A1 * 9/2016 Sasaki .................. G02B 6/3843 385/78
2021/0103089 A1 * 4/2021 Borrelli .............. G02B 6/02361
2021/0103090 A1 * 4/2021 Borrelli .............. G02B 6/02361
2023/0204850 A1 * 6/2023 Pandey ................ G02B 6/4482 385/126

FOREIGN PATENT DOCUMENTS

JP 2014-197094 A 10/2014
JP 2019038706 A * 3/2019

OTHER PUBLICATIONS

Arrizabalaga et al., Multi-parameter optical gauge based on mode coupling effect in asymmetric index multi-core fibres, Optics and Lasers in Engineering, vol. 154, 2022, 107047. (Year: 2022).*

Li et al., Role of wavelength dependent sensitivity in affecting the crosstalk mitigation of homogeneous multicore fiber: an analytical estimation approach, Opt. Express 22, 14127-14134 (2014) (Year: 2014).*

Xie et al., Impact analysis of a dense hole-assisted structure on crosstalk and bending loss in homogeneous few-mode multi-core fibers, Opt. Express 28, 23806-23819 (2020) (Year: 2020).*

English language translation of JP-2019038706-A (Year: 2019).*

* cited by examiner

MULTICORE OPTICAL FIBER

TECHNICAL FIELD

The present disclosure relates to a multicore optical fiber (Hereinafter, referred to as "MCF".).

The present application claims priority from Japanese Patent Application No. 2022-024891 filed on Feb. 21, 2022, the contents of which are relied upon and incorporated herein by reference in its entirety.

BACKGROUND

The MCF is an optical fiber having a plurality of cores, and each of the plurality of cores is surrounded by a cladding and has a refractive index higher than that of the cladding. In order to identify a plurality of cores, for example, as described in Japanese Patent Application Laid-Open No. 2011-170099 (Patent Document 1), markers having a refractive index different from the refractive index of the cladding are introduced into the cladding of the MCF. As a result, it is known that each of the plurality of cores can be identified in a cross section (end face) of the MCF cut at an arbitrary position along a longitudinal direction. The markers in the cladding are arranged at positions where the plurality of distances to the plurality of cores is not uniform. In the case of each of the markers having a refractive index higher than the refractive index of the cladding, this marker has a normalized frequency different from a normalized frequency of the cores. This suppresses coupling between a mode propagating in the core and a mode propagating in the marker, and as a result, suppresses noise mixing into signal light propagating in the core.

Note that, in the MCF of Patent Document 1, the marker is disposed outside a circumference of a circle having the circumference passing through a center of the core disposed so as to surround a fiber axis. In the MCF of Japanese Patent Application Laid-Open No. 2014-197094 (Patent Document 2), a marker is disposed inside a circumference of a circle having the circumference passing through a center of a core disposed so as to surround a fiber axis. In Japanese Patent Application Laid-Open No. 2014-048645 (Patent Document 3), one of cores arranged so as to surround a fiber axis is replaced with a marker, and rotational symmetry is imparted to an element arrangement including the core and the marker.

SUMMARY

As a result of studying the above-described conventional techniques, the inventors have found the following problems. That is, in the MCF, in the element arrangement of Patent Document 3 in which the marker for core identification is replaced with one of the plurality of cores (the arrangement of the core and the marker on a fiber end face), since the cores are arranged at equal intervals on the circumference, there is a case where it is difficult to identify the cores when a resolution of an image is low or when a focus is shifted in the image of the end face. On the other hand, in the element arrangement of Patent Document 1 and Patent Document 2, since rotational symmetry is broken by the marker (having a rotational symmetry of order 1), such a problem does not occur.

However, in the case of an MCF in which the element arrangement does not have rotational symmetry at a fiber end face, structural abnormality such as bubbles may occur at an interface between the marker and the cladding in the manufacturing process. In the manufacturing of the MCF by rod-in collapse, a core rod comprised of glass (a portion that becomes a core after drawing), a marker rod (a portion that becomes a marker after drawing), and a cladding member (a portion that becomes a cladding after drawing), which are separately synthesized, are integrated by heating. At this time, it is considered that a temperature and an internal stress are not necessarily uniform inside the heated cladding member depending on a radius, and as a result, air bubbles and the like are generated due to a difference in ease of contraction of holes of the cladding member between the vicinity of the core rod and the vicinity of the marker rod.

The present disclosure has been made to solve the above-described problems, and an object of the present disclosure is to provide an MCF having a structure for suppressing occurrence of structural abnormality such as air bubbles in the vicinity of a boundary between a marker and a cladding.

An MCF according to the present disclosure includes a glass optical fiber in which an element arrangement on an end face does not have rotational symmetry, and a resin coating. The glass optical fiber includes a plurality of cores each extending along a central axis (Hereinafter, referred to as a "fiber axis".), a marker extending along the plurality of cores, and a cladding surrounding the plurality of cores and the marker. The resin coating is provided on an outer peripheral surface of the glass optical fiber (on an outer peripheral surface of the cladding). In particular, on a cross section of the MCF orthogonal to the fiber axis, centers of the plurality of cores and a center of the marker constitute a plane figure having a rotational symmetry of order 1 with respect to a center of the cross section (a position intersecting the fiber axis). Furthermore, on the cross section, the marker is disposed so as to be located on a circumference of a circle having a center coinciding with the center of the cross section and having the circumference passing through the respective centers of the plurality of cores.

DETAILED DESCRIPTION

Description of Embodiments of Present Disclosure

Figure 1:
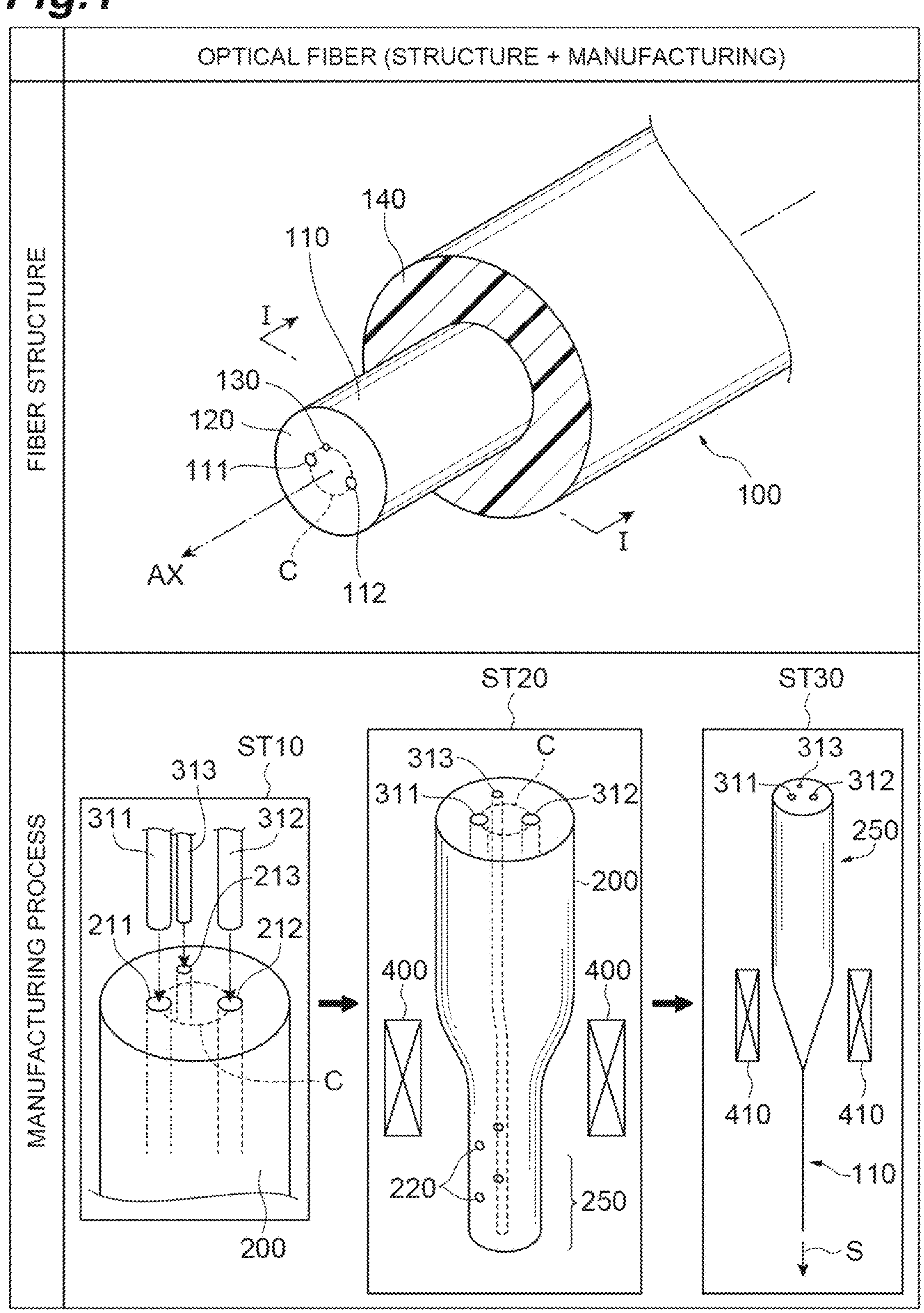
FIG. 1 is a diagram for explaining an example of a structure of an MCF according to the present disclosure and an example of a manufacturing process thereof.

First, contents of embodiments of the present disclosure will be individually listed and described.

(1) As one aspect, an MCF according to the present disclosure includes a glass optical fiber in which an element arrangement on an end face does not have rotational symmetry, and a resin coating. The glass optical fiber includes a plurality of cores extending along a fiber axis (central axis), respectively, a marker extending along the plurality of cores, and a cladding surrounding the plurality of cores and the marker. The resin coating is provided on an outer peripheral surface of the glass optical fiber (on an outer peripheral surface of the cladding). In particular, on a cross section of the MCF orthogonal to the fiber axis, centers of the plurality of cores and a center of the marker constitute a plane figure having a rotational symmetry of order 1 with respect to a center of the cross section (a position intersecting the fiber axis). Furthermore, on the cross section, the marker is disposed so as to be located on a circumference of a circle having a center coinciding with the center of the cross section and having the circumference passing through the respective centers of the plurality of cores.

According to the MCF having the above-described structure, it is possible to uniformly control a temperature and an internal stress along a radial direction of the cladding in the collapse process. That is, the ease of contraction of holes of the cladding in the vicinity of the core and in the vicinity of the marker is also equivalent. As a result, structural abnormalities such as bubbles at an interface between the marker and the cladding can be effectively suppressed.

(2) As one aspect of the present disclosure, with respect to a first core and a second core, among the plurality of cores, sandwiching the marker along the circumference of the circle, the marker preferably satisfies a relationship in which a ratio d1/d2 of a center-to-center distance d1 between the first core and the marker to a center-to-center distance d2 between the second core and the marker is less than 0.9. In this case, structural abnormalities such as bubbles at the interface between the marker and the cladding can be effectively suppressed while maintaining the original function of the marker.

(3) As one aspect of the present disclosure, a refractive index of the marker is preferably lower than a refractive index of the cladding. In this case, crosstalk and transmission loss caused by mode coupling between the marker and the core are suppressed.

(4) As one aspect of the present disclosure, a refractive index of the marker may be higher than a refractive index of the cladding, and a V value related to the marker at wavelength $\lambda$=0.6 μm may be 2.405 or less. In this case, since the marker propagates observation light having a visible light wavelength, structural abnormalities such as bubbles at the interface between the marker and the cladding can be effectively suppressed while maintaining the original function of the marker. Note that the V value for the marker is defined by the following Formula (1):

$$V=(2\pi/\lambda)\cdot r\cdot(n_{marker}^2-n_{clad}^2)^{1/2} \quad (1)$$

Here, $(2\pi/\lambda)$ is a wave number of light having a wavelength $\lambda$ in vacuum, r is a radius of the marker, $n_{marker}$ is a refractive index of the marker, and $n_{Clad}$ is a refractive index of the cladding.

As described above, each aspect listed in the section of [Description of Embodiments of Present Disclosure] is applicable to each of all the remaining aspects or to all combinations of these remaining aspects.

Details of Embodiments of Present Disclosure

Specific examples of the multicore optical fiber according to the present disclosure will be described in detail below with reference to the accompanying drawings. Note that the present disclosure is not limited to these examples, but is indicated by the claims, and is intended to include all modifications within the meaning and scope equivalent to the claims. Furthermore, in the description of the drawings, the same elements are denoted by the same reference signs, and redundant description is omitted.

FIG. 1 is a diagram for explaining an example of a structure of an MCF according to the present disclosure and an example of a manufacturing process thereof (In FIG. 1, it is referred to as "optical fiber (structure+manufacturing)".). An example of a representative structure of an MCF 100 according to the present disclosure is illustrated in an upper stage (In FIG. 1, it is referred to as a "fiber structure".) of FIG. 1. In a lower stage (In FIG. 1, it is referred to as a "manufacturing process".) of FIG. 1, a manufacturing process for obtaining the MCF 100 according to the present disclosure is illustrated.

The MCF 100 illustrated in the upper stage of FIG. 1 includes a glass optical fiber 110 and a resin coating 140 provided on an outer peripheral surface of the glass optical fiber 110. The glass optical fiber 110 includes two cores 111, 112, a cladding 120, and a marker 130. Three or more cores may be applied to the MCF 100. The two cores 111, 112 extend along the fiber axis (central axis) AX. The marker 130 extends along the two cores 111, 112. The cladding 120 surrounds the two cores 111, 112 and the marker 130. Note that the marker 130 has a refractive index different from a refractive index of the cladding 120.

In particular, on an end face of the glass optical fiber 110 (corresponding to a cross section of the glass optical fiber 110 orthogonal to the fiber axis AX), centers of the two cores 111, 112 and a center of the marker 130 constitute a plane figure having a rotational symmetry of order 1 with respect to a center of the end face (a position intersecting the fiber axis AX). Furthermore, on the end face, the marker 130 is disposed so as to be located on a circumference of a circle C having a center coinciding with the center of the end face and having the circumference passing through the respective centers of the two cores 111, 112.

The MCF 100 of the present disclosure is obtained by providing the resin coating 140 on the outer peripheral surface of the glass optical fiber 110 manufactured by the rod-in collapse method illustrated in the lower stage of FIG. 1. The rod-in collapse method includes at least an insertion step ST10 and a collapse step ST20, and a fiber preform is obtained by stretching a member manufactured through these steps to a predetermined outer diameter.

Specifically, in the insertion (rod-in) step ST10, a cladding member 200, core rods 311, 312, and a marker rod 313, which are synthesized separately, are prepared. The cladding member 200 is provided with insertion holes 211, 212, 213 extending along a longitudinal direction thereof. The core rods 311, 312 are inserted into the insertion holes 211, 212, respectively. The marker rod 313 is inserted into the insertion hole 213.

In the collapse step ST20, the cladding member 200 in which the core rods 311, 312 and the marker rod 313 are respectively inserted into the insertion holes 211, 212, 213 is heated by a heater 400. By heating the heater 400, the core rods 311, 312 and the marker rod 313, and the cladding member 200 are integrated, and a fiber preform 250 is obtained. Note that the fiber preform 250 may be stretched to a predetermined outer diameter after the collapse step ST20. Furthermore, a layer serving as an outer peripheral part of the cladding may be further provided on an outer peripheral surface of the fiber preform 250.

One end of the fiber preform 250 obtained through the above steps is drawn in a direction indicated by an arrow S while being heated by a heater 410, whereby the glass optical fiber 110 is obtained (drawing step ST30). Note that, as illustrated in the insertion step ST10 and the collapse step ST20 in the lower stage of FIG. 1, when a position of the insertion hole 213 into which the marker rod 313 is inserted is deviated from the circumference of the circle C having the circumference passing through the respective centers of the insertion holes 211, 212 on the end face of the cladding member 200, the temperature and the internal stress are not necessarily uniform in the radial direction inside the cladding member 200, so that there is a possibility that bubbles 220 are generated in the fiber preform 250 after the collapse.

Figure 2:
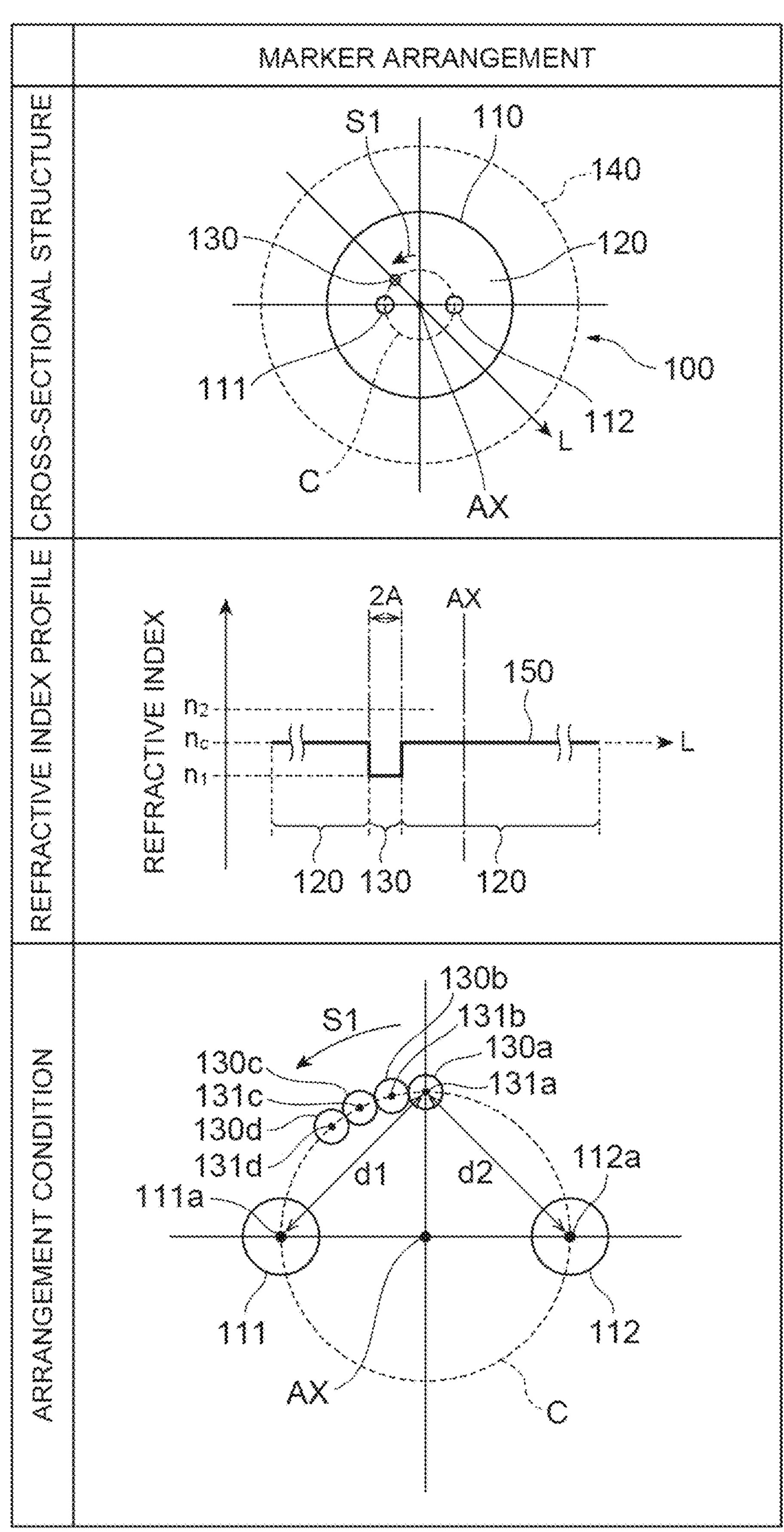
FIG. 2 is a diagram for explaining an example of a marker arrangement in the MCF according to the present disclosure.

FIG. 2 is a diagram for explaining an example of a marker arrangement in the MCF according to the present disclosure (In FIG. 2, it is described as "marker arrangement".). An upper stage (In FIG. 2, it is referred to as a "cross-sectional structure".) of FIG. 2 illustrates an example of a cross-sectional structure of the MCF 100 according to the present disclosure taken along line I-I illustrated in the upper stage of FIG. 1. In a middle part (Hereinafter, referred to as a "refractive index profile".) of FIG. 2, a refractive index profile 150 indicating the refractive index of each part along a line L illustrated in the upper stage of FIG. 2 is illustrated. A lower stage (In FIG. 2, it is described as "arrangement condition".) of FIG. 2 illustrates a diagram for explaining an arrangement condition of the marker in the MCF 100 according to the present disclosure. Note that the cross section illustrated in the lower stage of FIG. 2 is a cross section of the glass optical fiber 110 of the MCF 100 from which the resin coating 140 has been removed, and corresponds to a part of the fiber cross section taken along line I-I illustrated in the upper stage of FIG. 1.

As illustrated in the upper stage of FIG. 2, the glass optical fiber 110 of the MCF 100 includes the cladding 120, and the two cores 111, 112 and the marker 130 are disposed in the cladding 120 along the longitudinal direction of the MCF 100. The centers of the two cores 111, 112 and the center of the marker 130 constitute a plane figure having a rotational symmetry of order 1 with respect to a cross-sectional center (a position where the cross section and the fiber axis AX intersect). That is, an element arrangement including only the two cores 111, 112 has a rotational symmetry of order 2, but an element arrangement further including the marker 130 has no rotational symmetry, namely a rotational symmetry of order 1. The center of this marker 130 is disposed on the circumference of the circle C having the circumference passing through the centers of the two cores 111, 112 about the fiber axis AX. Note that the rotational symmetry of the planar figure is defined as that a figure obtained by rotating the planar figure by a predetermined angle coincides with the original figure. However, if an error in the positions of vertexes of the rotated figure and the original figure is smaller than the radii of the cores and the marker, both figures are considered to coincide with each other.

In the manufacturing process of the MCF 100 having the cross-sectional structure as described above, it is possible to match the collapse conditions of the marker 130 and the two cores 111, 112 inside the cladding member 200 in the collapse step ST20 (the lower stage of FIG. 1). That is, even when the temperature and the internal stress are not necessarily uniform in the radial direction of the cladding member 200, they are uniform in the circumferential direction. As a result, the insertion holes 211, 212, 213 of the cladding member 200 are almost as easily contracted near the two core rods 311, 312 and near the marker rod 313, and the cladding member 200 can be integrated with both the two core rods 311, 312 and the marker rod 313 in a sufficiently close contact state. When the close contact is not sufficient, a defective section in which the non-close contact portion expands and becomes bubbles may occur in the drawing step ST30. However, by sufficiently performing the close contact by the configuration of the present embodiment, the frequency of occurrence of a defective section due to bubbles is suppressed to be low, and an MCF not including a defective section due to bubbles can be manufactured over a section of 30 km or more, more preferably 60 km or more, so that the connection cost can be reduced.

Furthermore, the MCF 100 includes the refractive index profile 150 as illustrated in the middle stage of FIG. 2. That is, the marker 130 has a refractive index $n_1$ lower than a refractive index $n_C$ of the cladding 120 or a refractive index $n_2$ higher than the refractive index $n_C$ of the cladding 120. In either case, since the brightness of the marker 130 is different from that of the cladding 120 at the time of end face observation, it is easy to confirm the marker 130. Note that each of the two cores 111, 112 disposed so as to sandwich the fiber axis AX has a refractive index higher than the refractive index $n_C$ of the cladding 120.

The refractive index of the marker 130 may be different from the refractive index $n_C$ of the cladding 120 as described above, but under the condition that the refractive index of the marker 130 is higher than the refractive index $n_C$ of the cladding 120, the V value regarding the marker at the wavelength $\lambda$=0.6 μm is preferably 2.405 or less. Note that the V value is given by the above Formula (1). In this case, since the marker propagates observation light having a visible light wavelength, structural abnormalities such as bubbles at the interface between the marker and the cladding can be effectively suppressed while maintaining the original function of the marker.

Furthermore, the marker 130 (the marker illustrated in the upper stage of FIG. 2) is disposed such that the center thereof is located on the circumference of the circle C having the circumference passing through a center 111*a* of the core 111 and a center 112*a* of the core 112. In the lower stage of FIG. 2, the positions where the marker 130 can be disposed are illustrated along an arrow S1 in the order of a marker candidate 130*a* (center 131*a*), a marker candidate 130*b* (center 131*b*), a marker candidate 130*c* (center 131*c*), and a marker candidate 130*d* (center 131*d*). Note that, in the example illustrated in the lower stage of FIG. 2, a position of the marker candidate 130*a* in which a center-to-center distance d1 from the center 111*a* to the center 131*a* and a center-to-center distance d2 from the center 112*a* to the center 131*a* are equal is used as a reference. In order to specify an orientation of the core arrangement on the end face of the glass optical fiber 110, in the case of the example in the lower stage of FIG. 2, any one of the marker candidates 130*b* to 130*d* excluding the marker candidate 130*a* serving as the reference is adopted as the marker 130 illustrated in the upper stage of FIG. 2. Specifically, the marker 130 is selected from the marker candidates 130*a* to 130*d* such that a ratio d1/d2 of the center-to-center distance d1 from the core 111 to the center-to-center distance d2 from the core 112 is less than 0.9, more preferably less than 0.8. As a result, the planar figure constituted by the centers of the cores and the marker has mirror-image reversal asymmetry. Thereby, it is also possible to identify whether an observation edge is a drawing start edge or an end edge from the arrangement of the cores and the marker on the end face. Note that d1/d2 is preferably 0.5 or more. Thereby, polarization mode dispersion due to asymmetric residual stress caused by an asymmetric arrangement of the cores and the marker is suppressed.

Figure 3:
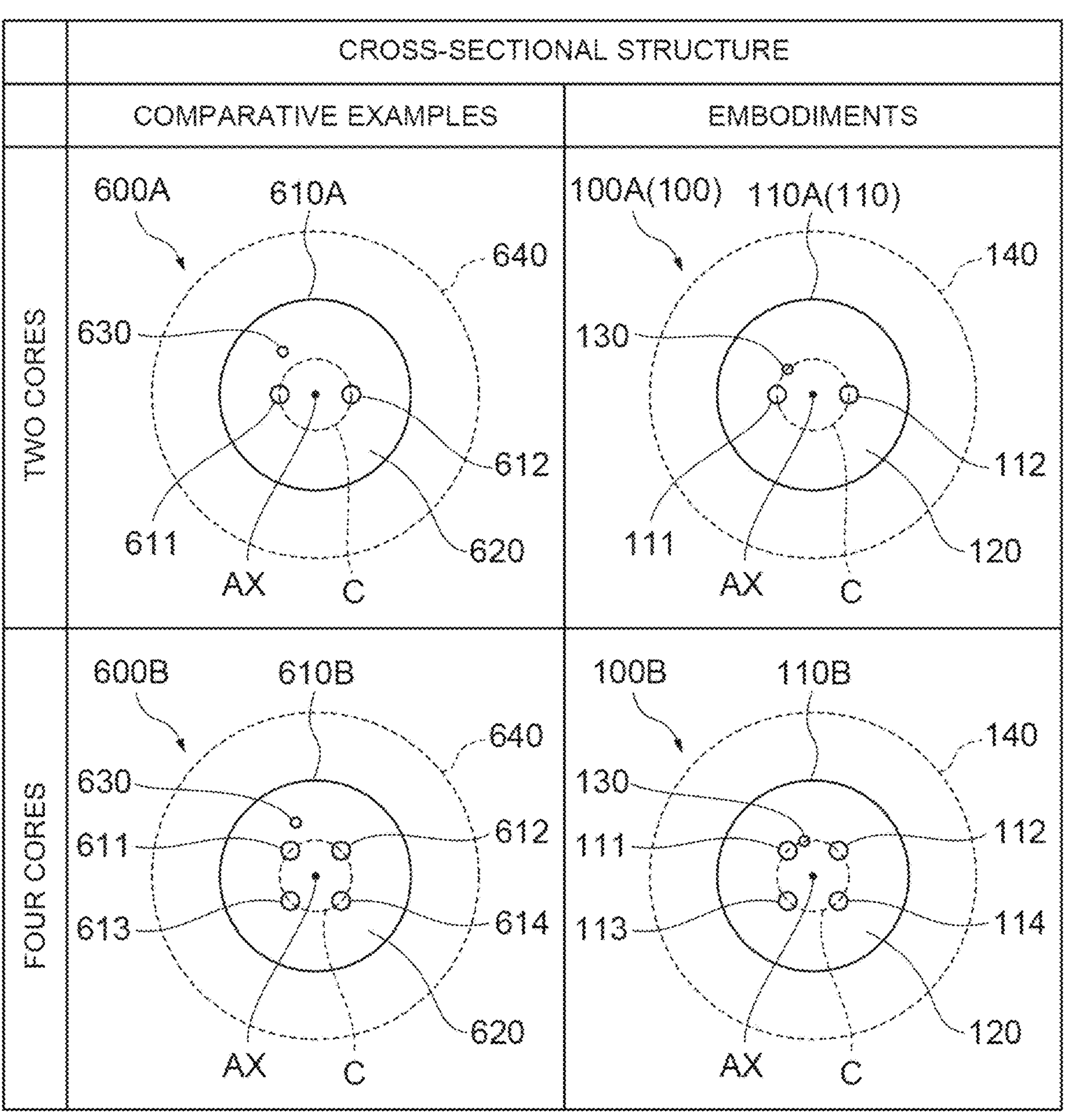
FIG. 3 is a diagram for explaining an example of a cross-sectional structure of each of the MCF according to the present disclosure and an MCF according to a comparative example.

FIG. 3 is a diagram for describing an example of a cross-sectional structure of each of the MCF according to the present disclosure and an MCF according to a comparative example (In FIG. 3, it is referred to as a "cross-sectional structure".). In an upper stage (In FIG. 3, it is referred to as "two cores".) of FIG. 3, cross-sectional structures of the MCF 600A according to the comparative example and the MCF 100A (100) of the present embodiment are illustrated. A lower stage (In FIG. 3, it is referred to as "four cores".) of FIG. 3 illustrates cross-sectional structures of the MCF 600B according to the comparative example and the MCF 100B of the present embodiment. Note that each fiber cross section illustrated in FIG. 3 corresponds to the fiber cross section taken along line I-I illustrated in the upper stage of FIG. 1.

The MCF 600A according to the comparative example illustrated in the upper stage of FIG. 3 is a two-core MCF. The MCF 600A includes a glass optical fiber 610A and a resin coating 640. The glass optical fiber 610A includes two cores 611, 612 extending along a fiber axis AX, a cladding 620, and a marker 630. However, in the MCF 600A according to the comparative example, the marker 630 is not disposed such that a center thereof is located on a circumference of a circle C having the circumference passing through centers of the two cores 611, 612 around the fiber axis AX. Furthermore, the MCF 600B according to the comparative example illustrated in the lower stage of FIG. 3 is a four-core MCF. The MCF 600B includes a glass optical fiber 610B and a resin coating 640. The glass optical fiber 610B includes four cores 611, 612, 613, 614 extending along a fiber axis AX, a cladding 620, and a marker 630. Similarly to the MCF 600A, in the MCF 600B according to the comparative example, the marker 630 is not disposed such that a center thereof is located on a circumference of a circle C having the circumference passing through centers of the four cores 611, 612, 613, 614 about the fiber axis AX.

On the other hand, the MCF 100A according to the present embodiment illustrated in the upper stage of FIG. 3 (corresponding to the MCF 100 illustrated in the upper stage of FIG. 1 and the upper stage of FIG. 2) is a two-core MCF. The MCF 100A includes a glass optical fiber 110A (corresponding to the glass optical fiber 110 illustrated in the upper stage of FIG. 1 and the upper stage of FIG. 2) and a resin coating 140. The glass optical fiber 110A includes two cores 111, 112 extending along a fiber axis AX, a cladding 120, and a marker 130. In the MCF 100A, the marker 130 is disposed such that its center is located on a circumference of a circle C having the circumference passing through centers of the two cores 111, 112 around the fiber axis AX. Furthermore, the MCF 100B according to the present embodiment illustrated in the lower stage of FIG. 3 is a four-core MCF. The MCF 100B includes a glass optical fiber 110B and a resin coating 140. The glass optical fiber 110B includes four cores 111, 112, 113, 114 extending along a fiber axis AX, a cladding 120, and a marker 130. Similarly to the MCF 100A, in the MCF 100B, the marker 130 is also disposed such that a center thereof is located on a circumference of a circle C having the circumference passing through centers of the four cores 111, 112, 113, 114 about the fiber axis AX.

In both the MCFs 600A, 600B according to the comparative example, the center position of the marker 630 is out of the circumference of the circle C. Therefore, the generation of the bubbles 220 cannot be suppressed in the collapse step ST20 illustrated in the lower stage of FIG. 1. On the other hand, according to the MCFs 100A, 100B according to the present embodiment, the center position of the marker 130 is located on the circumference of the circle C. In this case, in the collapse step ST20 illustrated in the lower stage of FIG. 1, the marker rod 313 and the core rods 311, 312 to be the two cores 111, 112 (or 4 cores 111, 112, 113, 114) have the same collapse condition, so that the generation of the bubbles 220 can be expected to be suppressed.

As described above, according to the MCF of the present disclosure, in the configuration in which the element arrangement on the fiber end face does not have rotational symmetry, structural abnormalities such as air bubbles at the interface between the marker and the cladding can be effectively suppressed.

REFERENCE SIGNS LIST

100, 100A, 100B MCF
110, 110A, 110B Glass optical fiber
111, 112, 113, 114 Core
111*a*, 112*a* Center
120 Cladding
130 Marker
130*a*, 130*b*, 130*c*, 130*d* Marker candidate
131*a*, 131*b*, 131*c*, 131*d* Center
140 Resin coating
150 Refractive index profile
200 Cladding member
211, 212, 213 Insertion hole
311,312 Core rod
313 Marker rod
220 Bubbles
250 Fiber preform
400,410 Heater
AX Fiber axis (central axis)
C Circle
ST10 Insertion step
ST20 Collapse step
ST30 Drawing step
S, S1 Arrow

What is claimed is:

1. A multicore optical fiber comprising:

a glass optical fiber including a plurality of cores each extending along a central axis, a marker extending along the plurality of cores, and a cladding surrounding the plurality of cores and the marker; and a resin coating provided on an outer peripheral surface of the glass optical fiber, wherein on a cross section of the multicore optical fiber orthogonal to the central axis, centers of the plurality of cores and a center of the marker constitute a plane figure having a rotational symmetry of order 1 with respect to a center of the cross section, on the cross section, the marker is disposed to be located on a circumference of a circle having a center coinciding with the center of the cross section and having the circumference passing through the centers of the plurality of cores, a refractive index of the marker is lower than a refractive index of the cladding, and a refractive index of each of the plurality of cores is higher than the refractive index of the cladding.

2. The multicore optical fiber according to claim 1, wherein with respect to a first core and a second core, among the plurality of cores, sandwiching the marker along the circumference of the circle, the marker is disposed to satisfy a relationship in which a ratio d1/d2 of a center-to-center distance d1 between the first core and the marker to a center-to-center distance d2 between the second core and the marker is less than 0.9.

3. The multicore optical fiber according to claim 1, wherein a refractive index of the marker is higher than a refractive index of the cladding, and a V value for the marker at wavelength λ is 2.405 or less, the V value being defined by the following Formula:

$$V=(2\pi/\lambda)\cdot r\cdot(n_{marker}^2-n_{clad}^2)^{1/2}$$

where (2π/λ) is a wave number of light having a wavelength λ in vacuum, r is a radius of the marker, $n_{marker}$ is the refractive index of the marker, and $n_{clad}$ is the refractive index of the cladding.

* * * * *